United States Patent

[11] 3,616,105

| [72] | Inventor | Theodore Marks |
| | | Hartsdale, N.Y. |
| [21] | Appl. No. | 818,992 |
| [22] | Filed | Apr. 24, 1969 |
| [45] | Patented | Oct. 26, 1971 |
| [73] | Assignee | American Technical Industries, Inc. |
| | | Mount Vernon, N.Y. |

[54] ARTIFICIAL TREE BRANCH OF FOLIAGE STAMPED FROM A RIBBON OF PLASTIC MATERIAL
1 Claim, 5 Drawing Figs.

[52] U.S. Cl. ................................................ 161/22, 93/1
[51] Int. Cl. ....................................................... A41g 1/00
[50] Field of Search ............................................ 161/22, 21, 25, 30; 93/1

[56] References Cited
UNITED STATES PATENTS

| 2,994,252 | 8/1961 | Lalick | 93/1 |
| 3,477,897 | 11/1969 | Hankus | 161/22 |
| 3,140,970 | 7/1964 | Reukauf | 161/22 X |
| 2,897,617 | 3/1959 | Popeil | 161/21 X |
| 3,014,300 | 12/1961 | Paul et al. | 161/22 |

*Primary Examiner*—Philip Dier
*Attorney*—Sandoe, Hopgood and Calimafde

ABSTRACT: The invention is an artificial tree branch made of foliage which is cut or stamped from a broad ribbon of sheet plastic material. The leaves of the branch extend from a supporting strip of the plastic which is supported by a stem, such as a wire, to which the leaf supporting strip is attached.

PATENTED OCT 26 1971 3,616,105

INVENTOR.
THEODORE MARKS
BY
Sandoe, Hopgood & Calimafde
ATTORNEYS

PATENTED OCT 26 1971 3,616,105

INVENTOR.
THEODORE MARKS
BY
Sandoe, Hopgood & Calimafde
ATTORNEYS

ARTIFICIAL TREE BRANCH OF FOLIAGE STAMPED FROM A RIBBON OF PLASTIC MATERIAL

BACKGROUND

THE INvention is in the field of artificial trees and bushes, and more specifically relates to the construction of branches for such trees and bushes.

Various methods have been employed in the past to affix the foliage of artificial bushes and trees to their branch stems, most of which require either intricate machinery or time-consuming manual labor in the assembly.

An object of the invention is to provide a tree branch which may be more easily assembled either by machine or by hand.

Another objective of the invention is to provide a simple and economically inexpensive method of manufacturing the foliage for the branches of artificial trees or bushes.

SUMMARY

Basically the invention comprises a branch for an artificial tree or bush comprised of a stem to which is attached a running ribbon of sheet plastic material, which ribbon has been cut away to form a string of leaves suspended by their stems from a substantially linear remaining base strip of said ribbon.

A primary advantage of the invention is that the string of leaves can be very easily cut from a continuous running ribbon of sheet plastic material.

Another advantage of the invention is that its construction may be employed in the production of bushes and trees having foliage which varies greatly in size and shape.

A further advantage of the invention is that it is a very inexpensive method of construction both from the standpoint of material costs and labor costs.

Other objectives, advantages, and various further features of novelty and invention will be pointed out or will occur to those skilled in the art from a reading of the following specification in conjunction with the accompanying drawings.

DETAILED DESCRIPTION OF THE INVENTION

Figure 1:
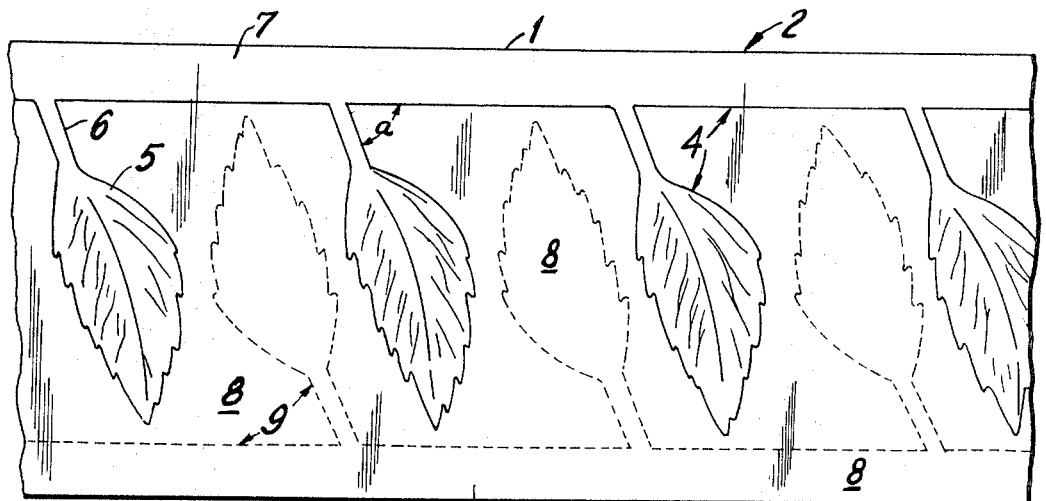
FIG. 1 is a plan view of a length of sheet plastic material having one foliage string of the invention cut therefrom, and illustrating how a second such string could be cut therefrom.

FIG. 1 illustrates one foliage string 1 of the invention cut from a broad ribbon of sheet plastic material 2. A second similar string 3 can be cut from the same sheet 2 as illustrated.

A broad ribbon 2 (e.g., 4 inches) of sheet plastic material is cut along line 4 to produce a first foliage string 1. Line 4 defines leaves 5, their supporting stems 6, and a base supporting strip 7 to which the leaf stems 6 are attached. A second foliage string 3 can be cut from the body 8 of ribbon 2 not utilized in the cutting of foliage string 1, by cutting along dotted line 9.

It is thus possible to simultaneously cut from a single ribbon 2 two strings of leaves, 1 and 3. The base supporting string 7 of the first string 1 is coincident with the top edge of ribbon 2 and the base supporting strip 10 of string 3 is coincident with the bottom edge of ribbon 2.

The angle $a$ between the stem 6 of the leaves 5 and the base strip 7 is desirably less than 90°. As will be illustrated, this causes the leaves 5 to extend more nearly perpendicular to the main stem of the branch 11 when foliage string 1 is properly wound thereon.

Figure 2:
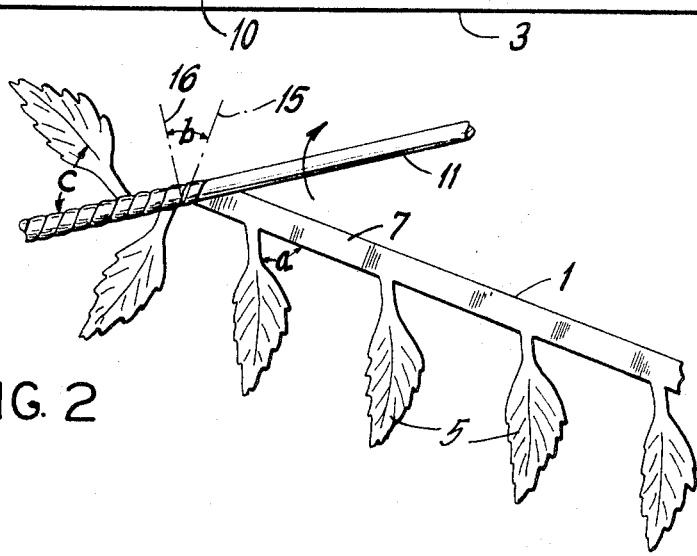
FIG. 2 is a perspective view of a branch stem with a foliage ribbon of the invention being applied thereto.

FIG. 2 illustrates the manner in which the foliage string 1 of FIG. 1 is applied to a branch stem 11. The base strip 7 of foliage string 1 is initially angled to the longitudinal axis of stem 11, so as to advance along the stem 11 with the leaves 5 depending in the opposite direction when it is wrapped therearound. Ideally, strip 7 will overlap itself on succeeding revolutions completely covering the stem 11. In order for this condition to prevail, the rate of advance of strip 7 along stem 11 must be small, and the pitch angle $b$ between the longitudinal axis 15 of base strip 7 and the lateral axis 16 of stem 11 will be correspondingly small. From an analysis of FIGS. 1 and 2, it can be seen that if angle $a$ is 90°, the angle $c$ at which the leaves depend from the branch stem 11 is equal to angle $b$. Angle $c$ is increased by decreasing angle $a$ until the leaves 5 extend from stem 11 to the desired degree.

The spacing of the leaves 5 upon base 7, and their shape may be varied to produce a branch of desired fullness.

A suitable adhesive applied to base strip 7 will hold the foliage in place upon stem 11. Stem 11 can be made of any desired material, such as wood or heavy wire which can be bent to any desired contour. Furthermore, stem 11 can have smaller branches extending therefrom which when also wrapped with a foliage string will result in a more natural looking tree or bush.

Figure 3:
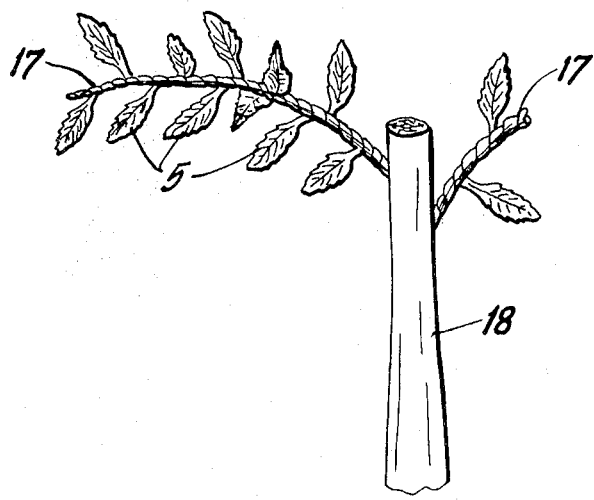
FIG. 3 is a partial view in perspective of an artificial bush having branches of the invention.

FIG. 3 illustrates a portion of a tree trunk 18 to which simple branches 17 such as that illustrated in FIG. 2 of the invention have been affixed. It will be apparent to those skilled in the art that by varying the contour and length of branches 17 a bush or tree of any desired size or shape may be created.

The stems and leaves can be made more stiff by the inclusion of a rib in ribbon 2, which rib runs from the base strip 7 along the stem 6 and down the back of the leaves 5. This rib can be molded into the ribbon 2 of plastic material in a repeating pattern coordinated with the frequency of the leaves along the base strips.

Figure 4:
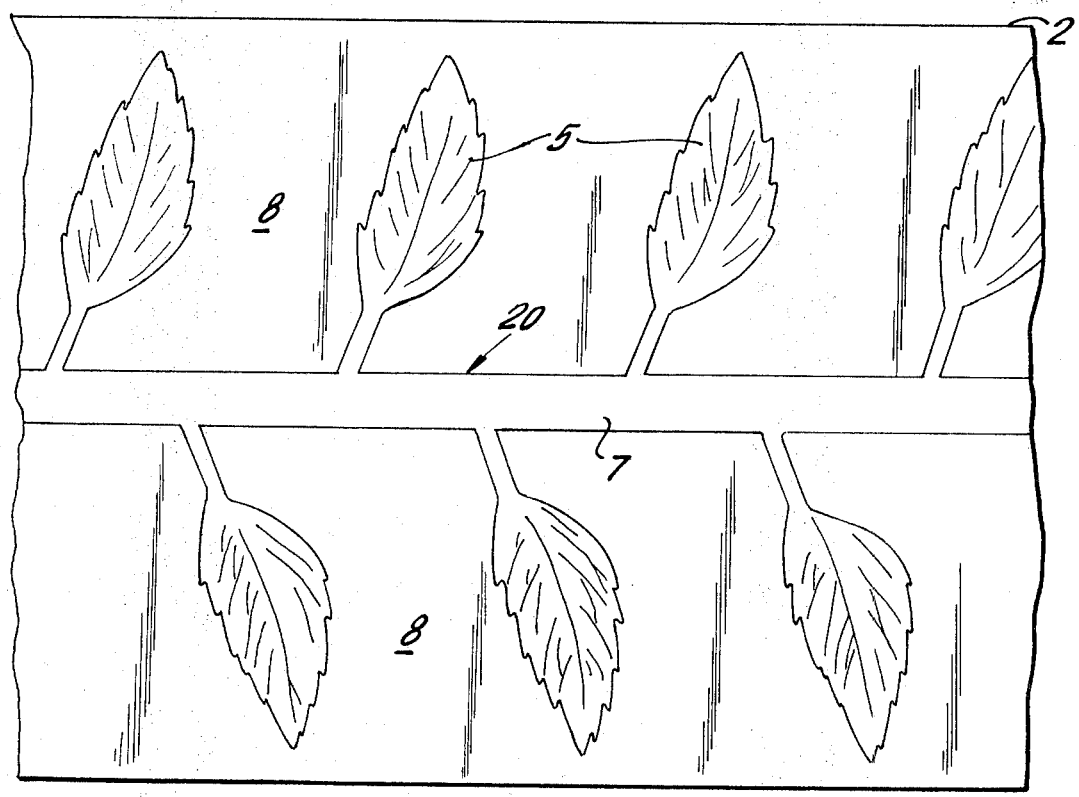
FIG. 4 is a plan view of a length of sheet plastic material having an alternate form of a foliage string of the invention cut therefrom.

FIG. 4 illustrates an alternate foliage string 20 of the invention cut from a ribbon 2 of polyvinyl chloride (PVC) or the like. In this configuration the supporting base strip 7 runs along the center of ribbon 2 and the leaves 5 extend from both sides thereof.

Figure 5:
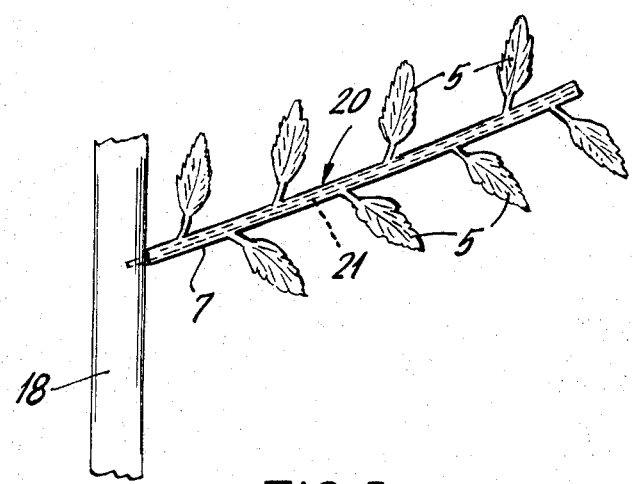
FIG. 5 is a perspective view of a branch stem of the invention with the foliage string of FIG. 4 applied thereto.

In FIG. 5 foliage string 20 is illustrated affixed to a branch stem 21 such as a 0.040 inch steel wire. In this alternate configuration, the foliage string 20 is not wrapped around stem 21 but is simply laid along it and glued thereto.

While the principles of the invention have been described in connection with the above specific apparatus, it is to be clearly understood that this description is made only by way of example and not as a limitation to the scope of the invention.

What is claimed is:

1. An artificial tree branch comprised of a stem, and foliage wrapped upon said stem, said foliage comprising a plurality of leaves, said leaves having stems extending therefrom, and a connecting strip of thin flexible material to which said stems are integrally connected, wherein the angle of intersection between said stems and said connecting strip is an acute angle less than 90°, and said strip is wrapped upon said stem in an overlapping relationship in the direction of the acute angle between said leaf stems and said connecting strip, so that said leaves extend from said stem at an angle greater than the angle of advance of said connecting strip.